United States Patent
Irwin

[15] 3,666,725
[45] May 30, 1972

[54] TRIS(ISOCYANATOTOLYL) ISOCYANURATE-TOLYLENE DIISOCYANATE COMPLEXES

[72] Inventor: Carl Francis Irwin, New Castle, Del.

[73] Assignee: E. I. du Pont de Nemours and Company, Wilmington, Del.

[22] Filed: Oct. 26, 1970

[21] Appl. No.: 84,150

[52] U.S. Cl............260/75 NT, 260/2.5 AW, 260/77.5 NC, 260/858
[51] Int. Cl. ...................................C08g 22/18, C08g 22/28
[58] Field of Search..........260/77.5 NC, 248 NS, 858, 75 NT

[56] References Cited

UNITED STATES PATENTS

| | | |
|---|---|---|
| 3,517,002 | 6/1970 | Heiss ........................................260/248 |
| 2,978,449 | 4/1961 | France et al. ...........................260/248 |
| 3,252,942 | 5/1966 | France et al. ...........................260/77.5 |
| 3,487,080 | 12/1969 | Matsui et al. ...........................260/248 |
| 3,573,259 | 3/1971 | Argabright et al. ....................260/77.5 |

*Primary Examiner*—Donald E. Czaja
*Assistant Examiner*—H. S. Cockeram
*Attorney*—Vernon R. Rice

[57] ABSTRACT

An aromatic polyisocyanate which is a molecular complex consisting of one molecule of tris(isocyanatotolyl) isocyanurate associated with two molecules of tolylene diisocyanate. The complex, which is a free-flowing crystalline powder low in toxicity, reacts with active-hydrogen containing compounds to form polyurethane coatings, foams, elastomers, etc. Such polyurethane coatings have particularly outstanding resistance to weather exposure and solvent attack.

10 Claims, No Drawings

TRIS(ISOCYANATOTOLYL) ISOCYANURATE-TOLYLENE DIISOCYANATE COMPLEXES

BACKGROUND OF THE INVENTION

Polyisocyanates are highly useful compounds which have gained wide acceptance as starting materials in the manufacture of useful products such as foams and coating materials. The isocyanates most extensively used are aromatic diisocyanates such as 2,4-tolylene diisocyanate (or a mixture thereof with 2,6-tolylene diisocyanate) and 4,4'-methylenebis(phenyl isocyanate), or crude mixtures containing the above isocyanates and various by-products produced during the manufacture of the isocyanates.

Although many of the known aromatic isocyanates are more or less suitable for use in preparing products such as polyurethane coatings and foams, there is a need for a polyisocyanate which has a functionality (isocyanato groups per molecule) greater than two. Isocyanates having higher functionalities generally yield faster curing coatings which are tougher and more stable against outdoor exposure and certain solvents than coatings prepared from lower-functional isocyanates. Foams prepared from higher functional isocyanates generally develop gel strength more rapidly and manifest improved compression set. Another highly desirable attribute of any isocyanate is low volatility (and thus low toxicity) at normal operating temperatures. Few, if any, of the known aromatic polyisocyanates combine all these attributes.

SUMMARY OF THE INVENTION

This invention provides an aromatic polyisocyanate which is a molecular complex represented by the formula

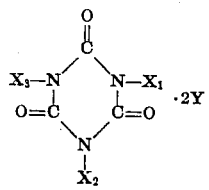

wherein $X_1$, $X_2$ and $X_3$ are independently a 3-isocyanato-4-methylphenyl radical, a 3-isocyanato-2-methylphenyl radical or a 5-isocyanato-2-methylphenyl radical and Y is 2,4-tolylene diisocyanate or 2,6-tolylene diisocyanate.

DETAILED DESCRIPTION

The molecular complex of this invention (hereinafter called "complex") consists of a tris(isocyanatotolyl) isocyanurate molecule (tolylene diisocyanate trimer) in association with two molecules of tolylene diisocyanate (TDI). The complex thus contains seven free isocyanato groups. Either of the tolylene diisocyanate isomers, 2,4- or 2,6-, can be included either in the TDI trimer or as the TDI molecules associated with the trimer. The preferred complexes are formed from mixtures of 2,4- and 2,6-TDI, usually in about an 80:20 ratio.

The complexes can be prepared by adding to tolylene diisocyanate a trimerization catalyst, e.g., tetramethylguanidine or tertiary amines such as triethyl amine or 2,4,6-tri(dimethylaminomethyl) phenol and heating the mixture to about 50°–70° C. to form TDI trimer. After the mixture contains about 20 percent by weight or more TDI trimer, the catalyst is rendered inactive by adding acids such as hydrogen chloride and phosphoric acid or acid halides such as phosgene, benzoyl chloride or acetyl chloride. The reaction mass is allowed to cool to room temperature and kept at room temperature for 24–48 hours during which the complex crystallizes. The complex is then filtered, washed and dried. In preparing the complex, the temperature of the trimer-TDI mixture in which the complex forms should be below the melting point of the complex since melting causes the complex to at least partially dissociate. In order to isolate the complex from a trimer-TDI mixture, the concentration of TDI and trimer in that mixture must be such that the complex is to some extent insoluble in the mixture and thus precipitates out. In general, the complex will precipitate from any trimer-TDI mixture containing about 20 percent by weight or more trimer. The complex can be formed in the presence or absence of a solvent. If a solvent is used, however, it must be a substance in which the complex does not appreciably dissociate, such as toluene or hexane.

The complexes are free flowing crystalline powders which melt over a narrow temperature range, the exact melting point depending on the TDI molecules which form the complex. Complexes formed entirely from 2,4-TDI molecules melt at about 72°–75° C. and complexes formed entirely from 2,6-TDI molecules melt at about 125°–132° C. Complexes made from mixtures of 2,4- and 2,6-TDI melt at temperatures intermediate the 2,4 - and 2,6-TDI complexes. The complexes are soluble in esters such as ethyl acetate, ketones such as acetone, and aromatic hydrocarbons such as benzene and toluene, but are relatively insoluble in aliphatic hydrocarbons such as n-hexane in which the complexes form a slurry. The complexes tend to dissociate to a considerable extent in esters and ketones but substantially maintain their integrity in aromatic and aliphatic hydrocarbons and halogenated hydrocarbons.

The complex can be destroyed by heating to a temperature sufficiently high to distill the TDI, leaving the TDI trimer. The TDI distillate recovered from this heating process is the quantity needed to complex with the trimer in the amount of two molecules of TDI per molecule of trimer. The infrared spectrum of the complex in chloroform matches the spectrum of a chloroform solution of 1 mole of TDI trimer and 2 moles of TDI at equal solute concentrations.

The complexes of this invention provide a polyisocyanate of high functionality in a conveniently-handleable physical form. Because the vapor pressure of the solid complex or certain solutions of the complex is almost nil, the complex has very low toxicity in comparison with other polyisocyanates such as TDI.

The complex can be used to prepare polyurethane products such as coatings and foams by reacting the complex with active-hydrogen containing compounds such as polyols, polyamines and water by techniques well known in the art.

The usual polyether and polyester polyols can be employed in preparing polyurethanes based on the trimer-complexes. Representative polyols are polyalkyleneether glycols such as polyethyleneether glycol, polypropyleneether glycol and polytetramethyleneether glycol and the polyethers prepared by the copolymerization of cyclic ethers such as ethylene oxide, propylene oxide, trimethylene oxide and tetrahydrofuran with aliphatic polyols such as ethylene glycol, 1,3-butanediol, glycerol and sorbitol; polyester glycols prepared by the polymerization of cyclic lactones such as ε-caprolactone or by the condensation polymerization of a dicarboxylic acid and a molar excess of an organic polyol, representative diacids being succinic, glutaric and adipic acids and representative organic polyols being ethylene glycol, propylene glycol, 1,3-butanediol and 1,4-butanediol.

It is also possible to employ as at least part of the polyol component, an aliphatic polyol having a low molecular weight such as ethylene glycol, 1,4-butanediol, trimethylol propane and glycerol. Polyamines such as methylenedianiline, m-tolylene diamine, 4,4'-methylene-bis(o-chloroaniline), hexamethylenediamine and the crude methylene-bridged polyarylene polyamines prepared by condensing aromatic diamines and formaldehyde can also be used as part of the active hydrogen containing compounds. Other representative polyols are given in U.S. Pat. No. 3,248,373 to Barringer. Detailed information on formulations and procedures for preparing representative urethane coatings, elastomers, adhesives and flexible foams can be found in Chapters VII, IX, X and XI of "Polyurethanes: Chemistry and Technology, Part II," Saunders and Frisch, Interscience Publishers (1964).

Typical of the coatings that can be prepared by the complexes of this invention are the moisture-cure coatings prepared by reacting about 1.6–2.0 equivalents of the complex with one equivalent of a polyether or polyester glycol having a molecular weight of about 200–1000. Alternatively, mixtures of polyether or polyester glycols with low molecular weight diols, said mixtures having average molecular weights of 200–1,000, can be used. The resulting reaction product when mixed with conventional coating solvents and curing catalysts can be applied by spraying, brushing or dipping and will cure in air. Two part coatings can be made in similar fashion, but cure is usually effected by adding about an equivalent amount of a low molecular weight diol to the solvent solution of the reaction product of polyisocyanate and glycol.

Flexible foams are preferably prepared by a quasi-or full-prepolymer procedure in which an excess of trimer complex is first reacted with a polyether or polyester diol and/or triol having an equivalent weight of about 500–1,500 to prepare an isocyanato-terminated prepolymer. By adding water (or in the case of quasi-prepolymer systems, water plus polyol) in amounts up to about equivalent to the available —NCO in the prepolymer, the foam is formed. Rigid and semi-rigid foams can be similarly prepared by using polyols having lower equivalent weights and functionalities of at least about 3.

The trimer-complexes of this invention yield polyurethane coatings which are tougher and more stable against outdoor exposure and certain solvents than are coatings prepared from other aromatic diisocyanates such as TDI.

The invention is further illustrated by the following examples wherein parts and percentages are by weight unless otherwise indicated.

EXAMPLE 1

The following procedure is used to prepare complexes of tolylene diisocyanate (TDI) trimer and TDI from the TDI compositions listed below:

A. 2,4-TDI
B. 80 percent 2,4-TDI; 20 percent 2,6-TDI
C. 60 percent 2,4-TDI; 40 percent 2,6-TDI
D. 2,6-TDI A mixture of 620 g. of TDI and 0.175 g. of 2,4,6-tris(dimethylaminomethyl) phenol was heated to 70° C. and agitated at 70° C. until the —NCO content of the reaction mass dropped to 35–36 percent. This decrease in —NCO content corresponds to the formation of about 50–55 percent by weight of TDI trimer. The reaction is stopped by the addition of 0.2 g. of benzoyl chloride. The reaction mass is allowed to cool to room temperature and kept at room temperature for 24–48 hours to permit the complex to crystallize. The thick mass is then agitated vigorously with 620 g. of a 1:1 solution by volume of n-hexane and the same TDI used in the trimerization. The resulting slurry is filtered and the solids are washed with about 200 g. of the 1:1 hexane-TDI solution and then with about 1,200 g. of n-hexane. The solid complex is air dried.

The following complexes are prepared by the above general procedure.

| Initial TDI composition | A | B | B¹ | C | D ᵇ |
|---|---|---|---|---|---|
| Isolated yield of complex, percent | 47.5 | 30 | ᵃ 10 | 32 | 33 |
| —NCO in complex, percent ᶜ (calc., 33.8%) | 33.4 | 33.5 | 33.2 | 32.4 | 32.2 |
| Melting range, ° C | 72–75 | 86–89 | 102–104 | 97–107 | 125–132 |
| Isomer ratio of TDI distilled from complex, percent 2,4-TDI | 100 | 90 | 86 | 86.6 | 0 |

ᵃ Yield reduced by washing with more solvent than used in general procedure.
ᵇ Used 1.225 g. of 2,4,6-tris(dimethylaminomethyl)-phenol and 1.5 g. of benzoyl chloride.
ᶜ As determined by amine equivalent, ASTM-D1638-60T.

The complexes have no odor of TDI.

They are further characterized by the following procedures and tests:

1. Quantitative determination of TDI in complex

About 1.5 g. of complex B¹ is weighed accurately into a distillation flask and 150 cc. of dimethyl phthalate is added. About 75 cc. of material is distilled from the flask at from 20 mm Hg pressure during which distillation the temperature ranges from 150° C. up to 166° C. The —NCO content of the distillate corresponds to a recovery of TDI equivalent to 100.4 percent of the TDI which would be contained in a complex of 1 mole of TDI trimer and 2 moles of TDI. When this procedure is repeated, the recovery of TDI is 99.8 percent of the calculated amount.

2. Infrared spectrum

The infrared spectrum of the complex in chloroform matches the spectrum of a chloroform solution of 1 mole of TDI trimer and 2 moles of TDI at equal solute concentrations.

3. Vapor pressure measurements

Using a Uni-jet TDI vapor detector, sold by Union Industrial Equipment Corporation, Fall River, Mass., the concentration of TDI vapors was determined in the gas phase over a series of solutions of the complex in different solvents. For comparison, similar measurements were made using TDI as the solute.

| Solvent | Solute | Concentration TDI in vapor, p.p.m. |
|---|---|---|
| Ethyl acetate, 25 ml | TDI, 1.2 g.¹ | 0.60 |
| Do | Complex B, 3 g | 0.08 |
| Do | Complex B, 6 g | 0.16 |
| Toluene, 25 ml | TDI, 1.2 g | 0.18 |
| Do | Complex B, 3 g | 0.03 |
| Chloroform, 25 ml | TDI, 1.2 g | 0.16 |
| Do | Complex B, 6 g | 0.02 |
| Do | TDI, 1.2 g.; trimer, 1.8 g | 0.16 |
| n-Hexane, 25 ml | TDI, 1.2 g | 0.80 |
| Do ² | Complex 3 g | 0.00 |

¹ Equivalent to quantity of TDI contained in 3 g. of complex.
² Complex is relatively insoluble in n-hexane and sample is a slurry.

The results indicate that the complex partially dissociates when it is dissolved in a solvent. The results further indicate that TDI and TDI trimer do not form a complex immediately when dissolved in a solvent. The absence of any dissociation in hexane indicates that the solid complex is quite stable at room temperature as further shown by the fact that the Uni-jet TDI detector gives a zero reading for the vapor above the complex in a closed container.

EXAMPLE 2

The following ingredients are added to an agitated reaction vessel to prepare a one-part moisture-curing urethane coating.

| | |
|---|---|
| Polypropylene ether glycol | 100.0 parts |
| Butanediol-1,3 | 9.0 parts |
| 2-Ethoxyethyl acetate | 51.5 parts |
| Xylene | 51.5 parts |
| Benzene | 10.0 parts |

Benzene and traces of water contained in the formulation are removed by distillation. The distillation is stopped after 10 parts of distillate has been collected. The temperature of the reactor contents is lowered to 30° C. and 46.0 parts of TDI—TDI trimer complex B of Example 1 is added to the formulation. The temperature of the reaction mass is raised to 90°–95° C. over a period of 30 minutes and maintained at 90°–95° C. for about 3 hours. The reaction mass is then cooled to about 25° C. and about 130 parts of additional xylene is added to reduce the solids or non-volatile content of the coating composition to 40 percent by weight. In addition, 1.5 parts of an ultraviolet light absorber, 2,2'-dihydroxy-4,4'-dimethoxybenzophenone, is added and mixed into the coating composition.

Three coats of the composition are applied by brush to 6 × 12 inch unprimed maple panels allowing 24 hours between coats. For comparison, three coats of commercial tung phenolic spar varnish are applied to unprimed maple panels. The test panels are exposed for 6 months at Hialeah, Florida at an angle of 45° facing south. At the end of the exposure, the panels coated with the urethane coating of this example have retained considerable gloss and the coating is intact. In contrast, the control spar varnish coated panels have lost their gloss and the coating is beginning to fail at the edges of the panel as evidenced by cracking.

What is claimed is:

1. An aromatic polyisocyanate composition consisting essentially of at least one tris-(isocyanatotolyl) isocyanurate-tolylene diisocyanate complex of the formula

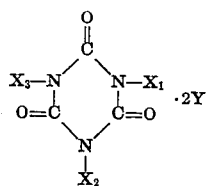

wherein $X_1$, $X_2$, and $X_3$ are independently a 3-isocyanato-4-methylphenyl radical, a 3-isocyanato-2-methylphenyl radical, or a 5-isocyanato-2-methylphenyl radical and Y is 2,4-tolylene diisocyanate or 2,6-tolylene diisocyanate.

2. A composition of claim 1 wherein the Y molecules are 2,4-tolylene diisocyanate and the $X_1$, $X_2$ and $X_3$ radicals are derived from 2,4-tolylene diisocyanate.

3. A composition of claim 1 wherein the Y molecules are 2,6-tolylene diisocyanate and the $X_1$, $X_2$ and $X_3$ radicals are derived from 2,6-tolylene diisocyanate.

4. A composition of claim 1 wherein the complex is formed from a mixture of 2,4- and 2,6-tolylene diisocyanates.

5. A polyurethane prepared by reacting the composition of claim 1 with at least one compound containing at least two Zerewitinoff hydrogens.

6. A polyurethane prepared by reacting the composition of claim 2 with at least one compound containing at least two Zerewitinoff hydrogens.

7. A polyurethane prepared by reacting the composition of claim 3 with at least one compound containing at least two Zerewitinoff hydrogens.

8. A polyurethane prepared by reacting the composition of claim 4 with at least one compound containing at least two Zerewitinoff hydrogens.

9. A coating composition according to claim 5 wherein the polyurethane is prepared by mixing about 1.6-2.0 equivalents of the polyisocyanate complex with about 1 equivalent of a polyether or polyester glycol having a molecular weight of about 200-1000 or with about 1 equivalent of a polyether or polyester glycol in admixture with a low molecular weight diol, said mixture having an average molecular weight of about 200-1000.

10. A coating composition according to claim 8 wherein the polyurethane is prepared by mixing about 1.6–2.0 equivalents of the polyisocyanate complex with about 1 equivalent of a polyether or polyester glycol having an average molecular weight of about 200–1,000 or with about 1 equivalent of a polyether or polyester glycol in admixture with a low molecular weight diol, said mixture having an average molecular weight of about 200–1,000.

* * * * *